UNITED STATES PATENT OFFICE.

SAML. T. ARMSTRONG, OF NEW YORK, N. Y.

IMPROVEMENT IN MAKING GUTTA-PERCHA HOLLOW WARE.

Specification forming part of Letters Patent No. 8,180, dated June 24, 1851.

*To all whom it may concern:*

Be it known that I, S. T. ARMSTRONG, of the city, county, and State of New York, have invented a new and useful Improvement in the Process of Manufacturing Hollow Ware or Articles of Gutta-Percha; and I do hereby declare that the following is a full, clear, and exact description of the principle or character which distinguishes it from all other things before known, and of the method of making, constructing, and using the same.

My improved process is applicable to the making of all kinds of hollow articles which can be formed in molds—such as bottles or articles which may be made hollow—of gutta-percha or gutta-percha compounded with other substances.

After the gutta-percha alone or compounded with other substances has been properly cleansed and prepared in any known or appropriate manner, it is to be formed into a pipe or tube, in the manner of making lead pipe, and for this purpose I use any of the known machines for making lead pipe. The gutta-percha during this part of the process should be kept at a temperature of about 150° of Fahrenheit's scale, which degree of heat is best preserved by applying heat to the exterior of the cylinder of the machine, as is sometimes practiced in the manufacture of lead pipes. As the gutta-percha pipe issues from the die of the machine in a heated state it is plastic and adhesive, so that the end can be closed by pressing it together. I then cut off a piece of the length required and insert it in a mold such as is used for molding glass, with the closed end downward, and after opening the upper end I insert the end of a metal pipe connected with a hydraulic apparatus and force in water under sufficient pressure to expand the gutta-percha until the external surface is brought in contact with the entire surface of the mold. I continue the pressure of water until the gutta-percha is cooled and set, and then I remove the pressure and take the article out of the mold, when it will be found to have taken the exact form of the mold, of whatever figure it may be.

If the form of the article admit of it, the mold may be made in a single piece, or it may be made in two or more parts, depending on the form of the article to be molded; and if the article to be produced is to be made with a neck, when the piece of gutta-percha pipe is put into it the upper or open end is to be prepared for the reception of the water-pipe by first inserting a conical plug into it until the external surface is forced out against the mold and the inside is made sufficiently large to receive the water-pipe; but if the article to be produced be without a neck, then the gutta-percha pipe is to be cut of greater length, and the open end is bound around the nozzle of the water-pipe to prevent the escape of water when pressure is applied. When the article has been formed the surplus is then cut off and the edge properly trimmed.

Bottles, vases, tumblers, powder-flasks, and such articles can be made in this way to great advantage and of great beauty, as the mold can be ornamented and chased in any way to suit fancy, and, however figured, if sufficient pressure be applied the gutta-percha will receive the impression of the entire figure. As the gutta-percha is cooled by forcing in the water to expand it, it will be set in the mold and retain the form thereof.

Many articles which are not required to be, but which admit of being made hollow—such as ornamental figures—may be advantageously molded by my improved process, and, if required, after such articles have been molded the nozzle through which the water was introduced can be properly trimmed and closed up.

What I claim as my invention, and desire to secure by Letters Patent in the process above described, is—

The method, substantially as described, of molding articles of gutta-percha or the compounds of gutta-percha with other substances by first making the same in the form of a pipe, and while in a partially heated and plastic state giving to it the form required in a mold by forcing a liquid inside to expand the gutta-percha, as described.

S. T. ARMSTRONG.

Witnesses:
 CHAS. J. GILBERT,
 CALLS. BROWNE.